United States Patent
Khalsa

(10) Patent No.: US 7,757,288 B1
(45) Date of Patent: Jul. 13, 2010

(54) MALICIOUS E-MAIL ATTACK INVERSION FILTER

(75) Inventor: Gurujiwan Khalsa, Berkeley, CA (US)

(73) Assignee: Symantec Corporation, Mountain View, CA (US)

(*) Notice: Subject to any disclaimer, the term of this patent is extended or adjusted under 35 U.S.C. 154(b) by 1451 days.

(21) Appl. No.: 11/135,833

(22) Filed: May 23, 2005

(51) Int. Cl.
*G08B 23/00* (2006.01)
(52) U.S. Cl. .................................. 726/24; 713/188
(58) Field of Classification Search ............ 726/2, 726/22, 26
See application file for complete search history.

(56) References Cited

U.S. PATENT DOCUMENTS

| | | |
|---|---|---|
| 6,167,434 A | 12/2000 | Pang |
| 6,249,807 B1 | 6/2001 | Shaw et al. |
| 6,282,565 B1 | 8/2001 | Shaw et al. |
| 6,289,416 B1 | 9/2001 | Fukushima et al. |
| 6,324,569 B1 | 11/2001 | Ogilvie et al. |
| 6,487,586 B2 | 11/2002 | Ogilvie et al. |
| 6,493,007 B1 | 12/2002 | Pang |
| 6,546,416 B1 | 4/2003 | Kirsch |
| 6,640,301 B1 | 10/2003 | Ng |
| 6,643,685 B1 | 11/2003 | Millard |
| 6,650,890 B1 | 11/2003 | Irlam et al. |
| 6,654,787 B1 | 11/2003 | Aronson et al. |
| 6,687,740 B1 | 2/2004 | Gough |
| 6,691,156 B1 | 2/2004 | Drummond et al. |
| 6,697,942 B1 | 2/2004 | L'Heureux |
| 6,701,347 B1 | 3/2004 | Ogilvie |
| 6,711,608 B1 | 3/2004 | Ogilvie |
| 6,732,157 B1 | 5/2004 | Gordon et al. |
| 6,757,713 B1 | 6/2004 | Ogilvie et al. |
| 6,757,830 B1 | 6/2004 | Tarbotton et al. |
| 7,058,968 B2 * | 6/2006 | Rowland et al. ............. 726/1 |
| 7,363,490 B2 * | 4/2008 | Paulsen et al. ............ 713/154 |
| 7,370,357 B2 * | 5/2008 | Sekar ....................... 726/23 |
| 7,404,205 B2 * | 7/2008 | Scoredos et al. ............ 726/13 |
| 7,409,712 B1 * | 8/2008 | Brooks et al. ............... 726/22 |
| 2002/0087641 A1 | 7/2002 | Levosky |
| 2002/0138581 A1 | 9/2002 | MacIntosh et al. |

(Continued)

OTHER PUBLICATIONS

CAUCE.org web pages [online] Coalition Against Unsolicited Commercial Email [retrieved Mar. 17, 2003] Retrieved from the Internet: <URL: http://www.cauce.org/about/problem.shtml> U.S.A.

(Continued)

*Primary Examiner*—Pramila Parthasarathy
(74) *Attorney, Agent, or Firm*—Fenwick & West LLP

(57) ABSTRACT

A malicious e-mail manager provides protection from malicious e-mail attacks. A malicious e-mail manager examines an e-mail stream, and identifies suspicious e-mail messages therein. The malicious e-mail manager inverts responses to addresses from which identified suspicious e-mail originated. Where the target address of a suspicious e-mail message points to an existing recipient, the malicious e-mail manager returns an error code to the originating address indicating that the recipient does not exist. On the other hand, where the target address of a suspicious e-mail message points to a non-existent recipient, the malicious email manager returns a success code to the originating address, indicating that the e-mail message was delivered. Thus, senders of malicious e-mail believe that existing users are non-existent and vice versa. E-mail from legitimate senders is handled normally.

24 Claims, 2 Drawing Sheets

U.S. PATENT DOCUMENTS

| | | | |
|---|---|---|---|
| 2003/0149726 | A1 | 8/2003 | Spear |
| 2003/0167311 | A1 | 9/2003 | Kirsch |
| 2003/0191969 | A1 | 10/2003 | Katsikas |
| 2003/0200334 | A1 | 10/2003 | Grynberg |
| 2003/0220978 | A1 | 11/2003 | Rhodes |
| 2003/0229672 | A1 | 12/2003 | Kohn |
| 2003/0233415 | A1 | 12/2003 | Beyda |
| 2004/0003283 | A1 | 1/2004 | Goodman et al. |
| 2004/0024823 | A1 | 2/2004 | Del Monte |
| 2004/0054887 | A1 | 3/2004 | Paulsen et al. |
| 2004/0064734 | A1 | 4/2004 | Ehrlich |
| 2004/0068534 | A1 | 4/2004 | Angermayr et al. |
| 2004/0073617 | A1 | 4/2004 | Milliken et al. |
| 2004/0093383 | A1 | 5/2004 | Huang et al. |
| 2004/0093384 | A1 | 5/2004 | Shipp |
| 2004/0111480 | A1 | 6/2004 | Yue |
| 2004/0148358 | A1 | 7/2004 | Singh et al. |
| 2004/0205173 | A1 | 10/2004 | Hall |
| 2005/0182959 | A1* | 8/2005 | Petry et al. ............... 713/200 |
| 2006/0206938 | A1* | 9/2006 | Petry et al. ............... 726/22 |

OTHER PUBLICATIONS

Outlook.spambully.com web pages [online] Spam Bully [retrieved Jan. 16, 2003] Copyright 2002, Retrieved from the Internet <URL: http://outlook.spambully.com/about.php>.

NBEC/NWOCA Anti-Spam Tools, [online] [retrieved Jul. 7, 2004] retrieved from http://home.nwoca.org, Ohio, U.S.A., Jul. 7, 2004.

Kularski, C. "Compound Procedures for Spam Control," Highland School of Technology, Gastonia, NC, U.S.A., Jan. 2004.

"Technical Responses to Spam," Nov. 2003, Taughannock Networks, Trumansburg, New York, U.S.A.

Cranor, Faith, L., LaMacchia, Brian A., "Spam!" Communications of the ACM, vol. 41, No. 8, pp. 74-83, Aug. 1998. U.S.A.

How it Works:Spam Recognition, http://www.death2spam.net/docs/classifier.html, retrieved Aug. 18, 2005, U.S.A.

Cavnar, William B. et al., "N-Gram-Based Text Categorization", Proceedings of SDAIR-94, 3rd Annual Symposium on Document Analysis and Information Retrieval, Las Vegas, NV., USA, Apr. 13, 1994.

"N-Gram-Based Text Categorization", 2 pages, downloaded from http://citeseer.ist.psu.edu/68861.html, Aug. 25, 2005 U.S.A.

TextCat Language Guesser, 2 pages, downloaded from http:/odur.let.rug.nl/~vannoord/Textcat/ on Aug. 25, 2005., U.S.A.

Spam Assassin, The Apache SpamAssasin Project, 2 pages, downloaded from http:/spamassasin.apache.org on Aug. 25, 2005, U.S.A.

Basis Technology's Rosette Language Identifier, 2 pages, downloaded from http:/www.basistech.com/language-identification/ on Aug. 25, 2005, U.S.A.

Karp-Rabin algorithm, 3 pages, downloaded from http:/www-igm.univ-mlv.fr/~lecroq/string/node5.html on Sep. 1, 2005, U.S.A.

Rabin-Karp string search algorithm, 5 pages, downloaded from http://en.wikipedia.org/wiki/Rabin-Karp_string_search_alogrithm on Aug. 31, 2005 U.S.A.

The Rabin-Karp algorithm, String searching via Hashing, 5 pages, downloaded from http://www.eecs.harvard.edu/~ellard/Q-97/HTML/root/node43 on Aug. 31, 2005 U.S.A.

* cited by examiner

MALICIOUS E-MAIL ATTACK INVERSION FILTER

TECHNICAL FIELD

This invention pertains generally to computer security, and more specifically to providing protection from spam and other malicious e-mail.

BACKGROUND

Spam and e-mail carrying malicious attachments (e.g., viruses, worms, etc.) are a serious computer security problem. Traditionally, senders of spam have obtained e-mail addresses by combing through web pages, bulletin boards, Usenet and the like. Addresses gleaned in this way were subsequently compiled, utilized for sending spam and/or sold to other spammers. Thus, once an e-mail address was posted in a publicly accessible location, the amount of spam sent to the e-mail address would typically increase rapidly.

As users and enterprises have become educated concerning best practices such as "munging" and spamtraps, these sources of addresses have diminished. As a result, spammers are now relying on new and more aggressive techniques for obtaining valid e-mail addresses. Today, savvy spammers prepare lists of e-mail addresses by sending out test spam messages to every conceivable user name at a target domain (a so called "dictionary attack"). The spammer then notes which e-mail messages reach their target recipient (and are thus valid addresses). To determine which e-mail messages reach their targets, the spammer can cull the bounces, monitor the logs of the transmitting server, and/or parse calls made to unique graphical beacons (e.g., small gif files) embedded in the test messages. Through this process, a spammer can assemble a list of e-mail addresses likely to be valid, and use the list to send out more spam (and/or sell the list to other senders of spam or other forms of malicious e-mail).

What is needed are computer implemented methods, computer readable media and computer systems for providing protection from spam and other malicious e-mail being sent to lists of e-mail addresses that are built in this manner.

DISCLOSURE OF INVENTION

Computer-implemented methods, computer systems and computer-readable media provide protection from malicious e-mail attacks. A malicious e-mail manager examines an e-mail stream, and identifies suspicious e-mail messages therein. The malicious e-mail manager inverts responses to addresses from which identified suspicious e-mail originated. Where the target address of a suspicious e-mail message points to an existing recipient, the malicious e-mail manager returns an error code to the originating address indicating that the recipient does not exist. On the other hand, where the target address of a suspicious e-mail message points to a non-existent recipient, the malicious email manager returns a success code to the originating address, indicating that the e-mail message was delivered. Thus, senders of malicious e-mail believe that existing users are non-existent and vice versa. E-mail from legitimate senders is handled normally.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
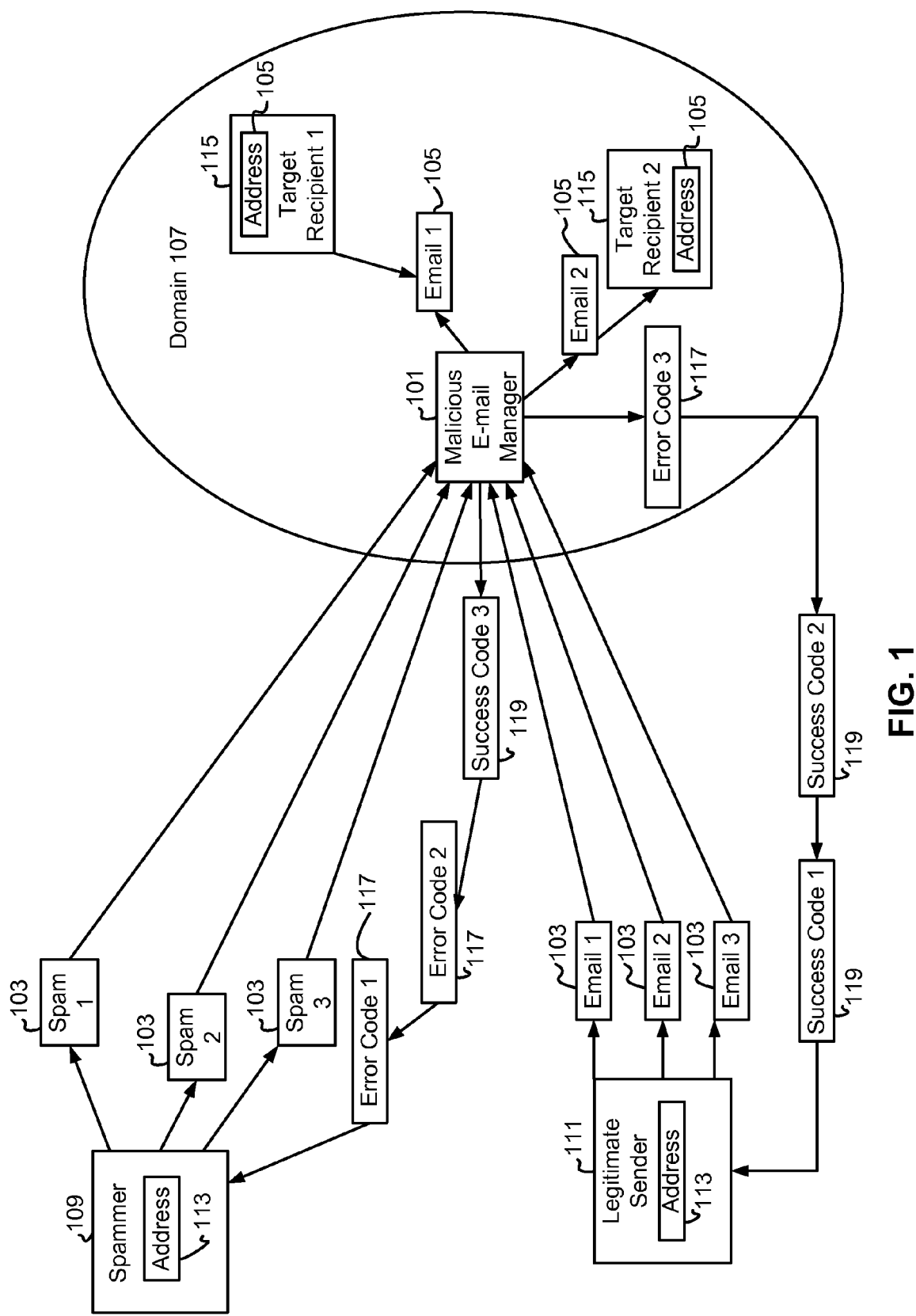
FIG. 1 is a block diagram, illustrating a high level overview of a system for preventing malicious e-mail attacks, according to some embodiments of the present invention.

FIG. 1 illustrates a high level overview of a system 100 for practicing some embodiments of the present invention. A malicious e-mail manager 101 provides protection from spam 103 and other malicious e-mail 103 being sent to lists of e-mail addresses 105 that are obtained by sending test e-mail messages 103 to determine whether a large number of target addresses 105 within a domain 107 are valid.

It is to be understood that although the malicious e-mail manager 101 is illustrated as a single entity, as the term is used herein a malicious e-mail manager 101 refers to a collection of functionalities which can be implemented as software, hardware, firmware or any combination of these. Where a malicious e-mail manager 101 is implemented as software, it can be implemented as a standalone program, but can also be implemented in other ways, for example as part of a larger program, as a plurality of separate programs, as one or more device drivers or as one or more statically or dynamically linked libraries.

It is to be further understood that a malicious e-mail manager 101 can be instantiated on and/or as part of a server, client, firewall, intrusion detection system, proxy, gateway, switch and/or any combination of these and/or other computing devices and/or platforms.

As illustrated in FIG. 1, e-mail 103 can be sent to a plurality target addresses 105 in a domain 107 by a spammer 109 (or other sender of malicious e-mail 103), or by a legitimate sender 111. The malicious e-mail manager 101 monitors an incoming e-mail 103 stream, and identifies suspicious e-mail messages 103 therein (e.g., e-mail messages 103 suspected of comprising spam or other forms of malicious e-mail 103, such as a virus). Various methodologies of identifying suspicious e-mail 103 are known to those of ordinary skill in the relevant art, and it is to be understood that different such methods can be utilized in various embodiments of the present invention.

For example, in some embodiments of the present invention, as e-mail messages 103 arrive at a domain 107, the malicious e-mail manager 101 tracks the originating address 113 (e.g., the Internet Protocol address of the sender), as well as the target address 105 of the intended recipient 105. The malicious e-mail manager 101 also tracks the delta between the time of arrival of that message 103 and the arrival time of the last message 103 that the same originating address 113 attempted to transmit to the same domain 107 (and/or to the same target address 105). The malicious e-mail manager 101 also determines whether or not the target recipient 115 actually exists. The malicious e-mail manager can then analyze this quad of information, looking at factors such as: a) the alphabetical order of target addresses 105 in previous quads containing the same originating address 113; b) the frequency and/or time of previous quads containing the same originating address 113; and c) a content based analysis of messages 103 from previous quads containing the same originating address 113.

The factors described above lend themselves well to detecting a dictionary attack. Of course, it will be understood that these are only examples of the types of analysis that can be used to determine whether an e-mail message 103 is suspicious. It is to understood further that a dictionary attack is only one type of e-mail 103 attack that can be detected and managed by the present invention. In some embodiments, other combinations of the above factors, single ones of the above factors, and/or other factors alone and/or in combination can be used to determine whether e-mail messages 103 are suspicious.

Other methods of detecting suspicious e-mail messages 103 are known to those of ordinary skill in the relevant art. For example, hashes of incoming messages 103 can be compared to hashes of known malicious e-mail 103, or incoming messages 103 can be scanned for known malicious signatures. The implementation mechanics of the usage of these and other methods within the context of the present invention will be apparent to those of ordinary skill in the relevant art in light of the present specification.

Where an e-mail message 103 is deemed to be legitimate, the malicious e-mail manager 101 processes it normally. In other words, if the intended recipient 115 actually exists, then the message 103 is passed on to that user 115. Likewise, if the recipient 115 is nonexistent, normal error handling of the message 103 is executed.

On the other hand, responsive to identifying a requisite number of suspicious e-mail messages 103 originating from the same address 113, the malicious e-mail manager 101 inverts responses to the originating address 113 of the identified suspicious e-mail messages 103. The number of suspicious e-mail messages 103 required to trigger inversion is a variable design parameter, that can be as few as one or as high as is deemed appropriate, based on the level of sensitivity desired for the corresponding protection. In some embodiments, the malicious e-mail manager 101 inverts an originating address 113 responsive to a requisite number of suspicious e-mail messages 103 greater than one originating from that address 113 within a set time period. Again, the time period to use is a design parameter, which can be set up or down as desired.

Whereas e-mail 103 received from a non-inverted address 113 is handled in a standard way, e-mail messages 103 received from an inverted address 113 are handled in the opposite manner. In other words, if the target recipient 115 exists, then the message 103 is "bounced" (i.e., an error code 117 is returned indicating that the recipient 115 does not exist). The message 103, which is assumed to be malicious, is not delivered to the recipient 115, and the malicious e-mail manager 101 spoofs the malicious sender 109 by returning the error code 117, indicating that the target recipient address 105 is not valid.

If an originating address 113 is inverted and the recipient 115 does not exist, the malicious e-mail manager 101 returns a success code 119 to the originating address 113, simulating successful delivery of the message 113. There should be no discernable difference between an inverted success return code 119 simulating delivery of a message 103 to a non-existent user 115 and a non-inverted "true" success return code 119, returned when a message 103 has actually been delivered to an existing recipient 115.

Thus, a malicious sender 109 will have no idea that the attack has been foiled because e-mail conversations seem to continue normally, but with messages 103 sent to existent users 115 returning a user unknown code 117, and messages sent to non-existent users 115 being accepted normally. The returning of e-mail protocol success codes 119 and error codes 117 is known to those of ordinary skill in the relevant art, and the implementation mechanics thereof in the context of the present invention will be apparent to those so skilled in light of the present specification.

Figure 2:
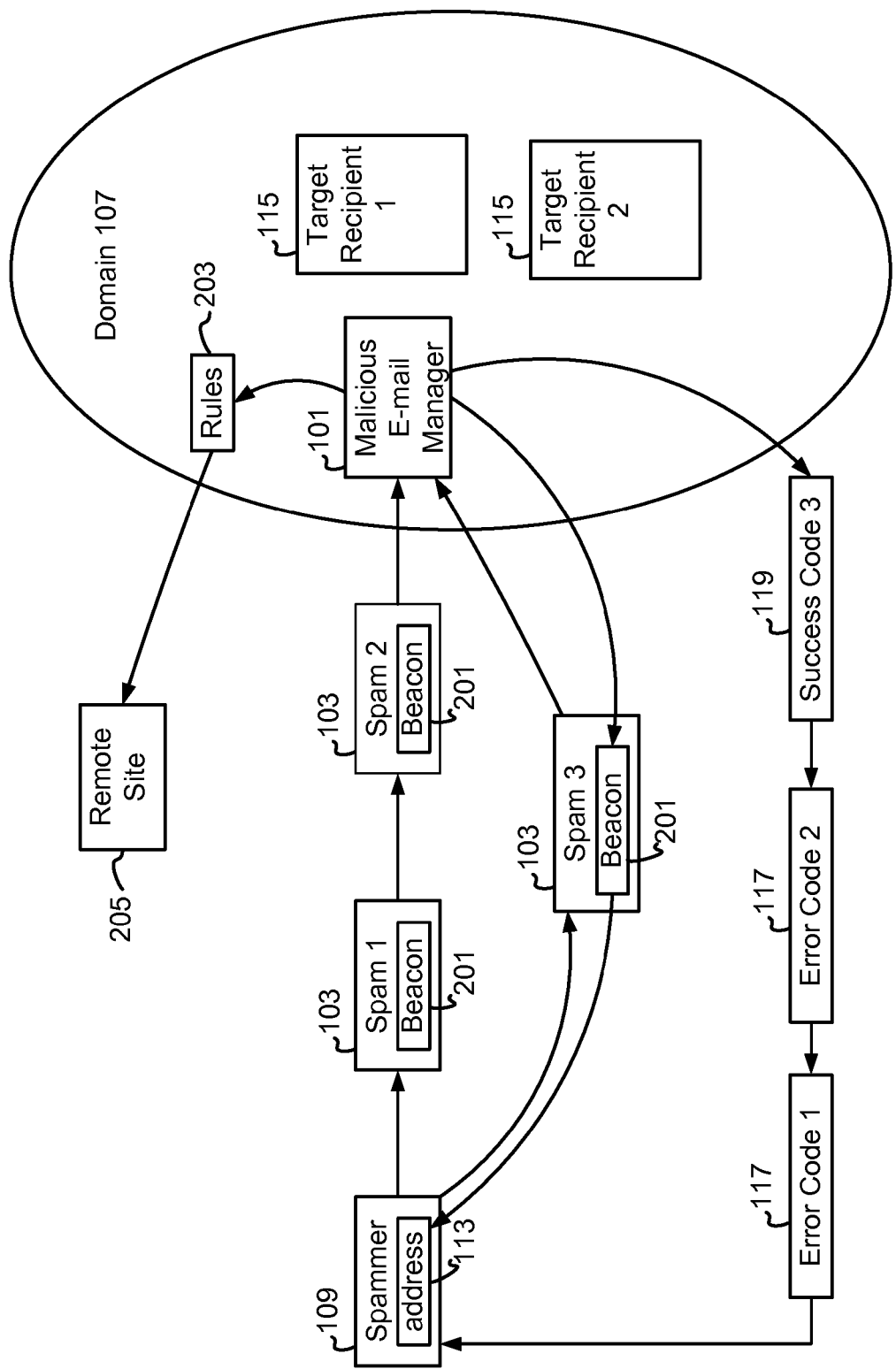
FIG. 2 is a block diagram, illustrating a malicious e-mail manager processing e-mail messages containing graphical web beacons, according to some embodiments of the present invention.

Turning now to FIG. 2, some e-mail messages 103 (for example, those marked up in hypertext markup language, or HTML) can contain graphical web beacons 201 that are inserted by the sender 109 to determine whether the message 103 has been accessed. A web beacon 201 is typically a small amount of graphical data typically invisible or difficult to notice. These can comprise, for example, very small files each having a unique filename matched to the intended recipient 115 of the message 103. When the message 103 is received and viewed (e.g., when the HTML is rendered), the existence of the recipient 115 thereby is confirmed to the sender 109.

To protect against malicious senders 109 identifying valid e-mail addresses 105 through the use of graphical web beacons 201, the malicious e-mail manager 101 can access the web beacons 201 in such messages 103 originating from inverted addresses 113. More specifically, in some embodiments of the present invention, when an e-mail message 103 originating from an inverted address 113 is targeted to a non-existent recipient 115, the malicious e-mail manager 101 "views" the e-mail 103 by scanning for images and other document components comprising web beacons 201. When a web beacon 201 is found, the malicious e-mailer manager 101 accesses the web beacon 201, which creates the illusion to the sender 109 that the non-existent e-mail address 105 is valid. On the other hand, when an e-mail message 103 originating from an inverted address 113 is addressed to an existent recipient 115, the malicious e-mail manager 101 does not access any imbedded web beacons 201, thereby propagating the false impression to the malicious sender 109 that the valid e-mail address 105 is non-existent.

As will be apparent to those of ordinary skill in the relevant art in light of the above discussion, the present invention will prevent malicious senders 109 from assembling lists of existent target e-mail addresses 105 by causing the senders 109 to believe that non-existent target addresses 105 are valid and vice versa. The malicious senders 109 will thus send unwanted e-mail 103 to non-existent addresses 105, and ignore the valid addresses 105 within the domain 107, believing them to point to non-existent users 115.

In some embodiments of the present invention, when a suspicious e-mail 103 is identified, in addition to executing the inversion methodology described above, the malicious e-mail manager 101 can take further action as desired, in order to ensure that the identified unwanted e-mail 103 is blocked in the future if it retransmitted, even from another address 113. The malicious e-mail manager 101 can create a blocking rule 203 based on the forensics of the e-mail 103 (e.g., a hash of the e-mail 103 or a more sophisticated content-based analysis hereof). Such rules 203 or other useful information concerning the malicious e-mails 103 (or alternatively the e-mails 103 themselves) can also be transmitted to remote sites 205 for further analysis, or to allow other domains 107 to detect the malicious message 103. Additionally, in some embodiments, whenever a malicious message 103 is detected, the malicious e-mail manager 101 further blocks, quarantines, deletes or analyzes the message 103 as desired.

As will be understood by those familiar with the art, the invention may be embodied in other specific forms without departing from the spirit or essential characteristics thereof. Likewise, the particular naming and division of the modules, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method comprising the steps of:
    using a computer to perform steps comprising:
        examining an e-mail stream;
        identifying at least one suspicious e-mail message in the e-mail stream;
        responsive to identifying at least one e-mail message as being suspicious, inverting at least one response to an address from which identified suspicious e-mail originated, wherein the inverting comprises, responsive to a target address of the suspicious e-mail message pointing to an existing recipient, returning an error code to the originating address indicating that the recipient does not exist; and
    performing at least one additional step from a group of steps consisting of:
        analyzing the suspicious e-mail message;
        quarantining the suspicious e-mail message;
        deleting the suspicious e-mail message;
        blocking the suspicious e-mail message;
        generating at least one rule concerning the suspicious e-mail message;
        forwarding the suspicious e-mail message to a remote site; and
        transmitting information concerning the suspicious e-mail message to a repository accessible to other computing devices.

2. The method of claim 1 wherein identifying a suspicious e-mail message further comprises:
    identifying at least one suspicious criteria concerning the e-mail message from a group of criteria consisting of:
        the originating address of the e-mail message;
        the target address of the e-mail message;
        time of e-mail traffic sent from the originating address to a target domain;
        time of e-mail traffic sent from the originating address to the target address;
        frequency of e-mail traffic sent from the originating address to the target domain;
        frequency of e-mail traffic sent from the originating address to the target address; and
        whether the target address points to an existing recipient.

3. The method of claim 2 wherein identifying a suspicious e-mail message further comprises:
    identifying a suspicious combination of at least two of the criteria of the group of criteria.

4. The method of claim 1 wherein identifying a suspicious e-mail message further comprises:
    determining that the e-mail message is a part of a dictionary attack.

5. The method of claim 1 wherein inverting a response to the originating address of an identified suspicious e-mail message further comprises:
    responsive to the target address of the suspicious e-mail message pointing to a non-existent recipient, returning a success code to the originating address indicating that the e-mail message was delivered.

6. The method of claim 5 further comprising:
    responsive to the target address of the suspicious e-mail message pointing to a non-existent recipient and the e-mail message containing a graphical tracking beacon, accessing the graphical tracking beacon.

7. The method of claim 1 wherein inverting at least one response to an originating address of an identified suspicious e-mail message is further in response to:
    identifying a plurality of e-mail messages originating from the originating address as being suspicious.

8. The method of claim 1 further comprising:
    identifying at least one non-suspicious e-mail message in the e-mail stream;
    determining whether the targeted recipient exists; and
    responsive to the results of the determining step, performing a step from a group of steps consisting of:
        responsive to determining that the target recipient exists, delivering the non-suspicious e-mail message to the recipient; and
        responsive to determining that the target recipient does not exist, returning an appropriate error code to the originating address indicating that the recipient does not exist.

9. A computer readable medium containing a computer program product comprising:
    program code for examining an e-mail stream;
    program code for identifying at least one suspicious e-mail message in the e-mail stream;
    program code for, responsive to identifying at least one e-mail message as being suspicious, inverting at least one response to an address from which identified suspicious e-mail originated, wherein the inverting comprises, responsive to a target address of the suspicious e-mail message pointing to an existing recipient, returning an error code to the originating address indicating that the recipient does not exist and
    program code for performing at least one additional step from a group of steps consisting of:
        analyzing the suspicious e-mail message;
        quarantining the suspicious e-mail message;
        deleting the suspicious e-mail message;
        blocking the suspicious e-mail message;
        generating at least one rule concerning the suspicious e-mail message;
        forwarding the suspicious e-mail message to a remote site and transmitting information concerning the suspicious e-mail message to a repository accessible to other computing devices.

10. The computer program product of claim 9 further comprising:
program code for identifying a suspicious e-mail message by identifying at least one suspicious criteria concerning the e-mail message from a group of criteria consisting of:
the originating address of the e-mail message;
the target address of the e-mail message;
time of e-mail traffic sent from the originating address to a target domain;
time of e-mail traffic sent from the originating address to the target address;
frequency of e-mail traffic sent from the originating address to the target domain;
frequency of e-mail traffic sent from the originating address to the target address; and
whether the target address points to an existing recipient.

11. The computer program product of claim 10 wherein the program code for identifying a suspicious e-mail message further comprises:
program code for identifying a suspicious combination of at least two of the criteria of the group of criteria.

12. The computer program product of claim 9 wherein the program code for identifying a suspicious e-mail message further comprises:
program code for determining that the e-mail message is a part of a dictionary attack.

13. The computer program product of claim 9 wherein the program code for inverting a response to the originating address of an identified suspicious e-mail message further comprises:
program code for, responsive to the target address of the suspicious e-mail message pointing to a non-existent recipient, returning a success code to the originating address indicating that the e-mail message was delivered.

14. The computer program product of claim 13 further comprising:
program code for, responsive to the target address of the suspicious e-mail message pointing to a non-existent recipient and the e-mail message containing a graphical tracking beacon, accessing the graphical tracking beacon.

15. The computer program product of claim 9 wherein the program code for inverting at least one response to an originating address of an identified suspicious e-mail message is further for inverting responses in response to:
identifying a plurality of e-mail messages originating from the originating address as being suspicious.

16. The computer program product of claim 9 further comprising:
program code for identifying at least one non-suspicious e-mail message in the e-mail stream;
program code for determining whether the targeted recipient exists; and
program code for, responsive to the results of the determining step, performing a step from a group of steps consisting of:
responsive to determining that the target recipient exists, delivering the non-suspicious e-mail message to the recipient; and
responsive to determining that the target recipient does not exist, returning an appropriate error code to the originating address indicating that the recipient does not exist.

17. A computer system comprising:
a computer readable medium comprising:
a software portion configured to examine an e-mail stream;
a software portion configured to identify at least one suspicious e-mail message in the e-mail stream;
a software portion configured to, responsive to identifying at least one e-mail message as being suspicious, invert at least one response to an address from which identified suspicious e-mail originated, wherein the inverting comprises, responsive to a target address of the suspicious e-mail message pointing to an existing recipient, returning an error code to the originating address indicating that the recipient does not exist; and
a software portion configured to perform at least one additional step from a group of steps consisting of:
analyzing the suspicious e-mail message;
quarantining the suspicious e-mail message;
deleting the suspicious e-mail message;
blocking the suspicious e-mail message;
generating at least one rule concerning the suspicious e-mail message;
forwarding the suspicious e-mail message to a remote site and
transmitting information concerning the suspicious e-mail message to a repository accessible to other computing devices.

18. The computer system of claim 17, wherein the computer readable medium further comprises:
a software portion configured to identify a suspicious e-mail message by identifying at least one suspicious criteria concerning the e-mail message from a group of criteria consisting of:
the originating address of the e-mail message;
the target address of the e-mail message;
time of e-mail traffic sent from the originating address to a target domain;
time of e-mail traffic sent from the originating address to the target address;
frequency of e-mail traffic sent from the originating address to the target domain;
frequency of e-mail traffic sent from the originating address to the target address; and
whether the target address points to an existing recipient.

19. The computer system of claim 18 wherein the software portion configured to identify a suspicious e-mail message is further configured to:
identify a suspicious combination of at least two of the criteria of the group of criteria.

20. The computer system of claim 17 wherein the software portion configured to identify a suspicious e-mail message is further configured to:
determine that the e-mail message is a part of a dictionary attack.

21. The computer system of claim 17 wherein the software portion configured to invert a response to the originating address of an identified suspicious e-mail message is further configured to:
return a success code to the originating address indicating that the e-mail message was delivered, responsive to the target address of the suspicious e-mail message pointing to a non-existent recipient.

22. The computer system of claim 21, wherein the computer readable medium further comprises:
a software portion configured to, responsive to the target address of the suspicious e-mail message pointing to a non-existent recipient and the e-mail message containing a graphical tracking beacon, access the graphical tracking beacon.

23. The computer system of claim 17 wherein the software portion configured to invert at least one response to an originating address of an identified suspicious e-mail message is configured to do so further in response to:

identifying a plurality of e-mail messages originating from the originating address as being suspicious.

24. The computer system of claim 17, wherein the computer readable medium further comprises:

a software portion configured to identify at least one non-suspicious e-mail message in the e-mail stream;

a software portion configured to determine whether the targeted recipient exists; and a software portion configured to, responsive to the results of the determining step, perform a step from a group of steps consisting of:

responsive to determining that the target recipient exists, delivering the non-suspicious e-mail message to the recipient; and responsive to determining that the target recipient does not exist, returning an appropriate error code to the originating address indicating that the recipient does not exist.

* * * * *